J. K. WINSLOW.
FEED BOX.
APPLICATION FILED DEC. 26, 1911. RENEWED JAN. 12, 1916.

1,196,061.

Patented Aug. 29, 1916.
2 SHEETS—SHEET 1.

Inventor
James K. Winslow.

Witnesses
Howard P. King.
Alfred G. Seiler

By Geo. W. Sues.

Attorney

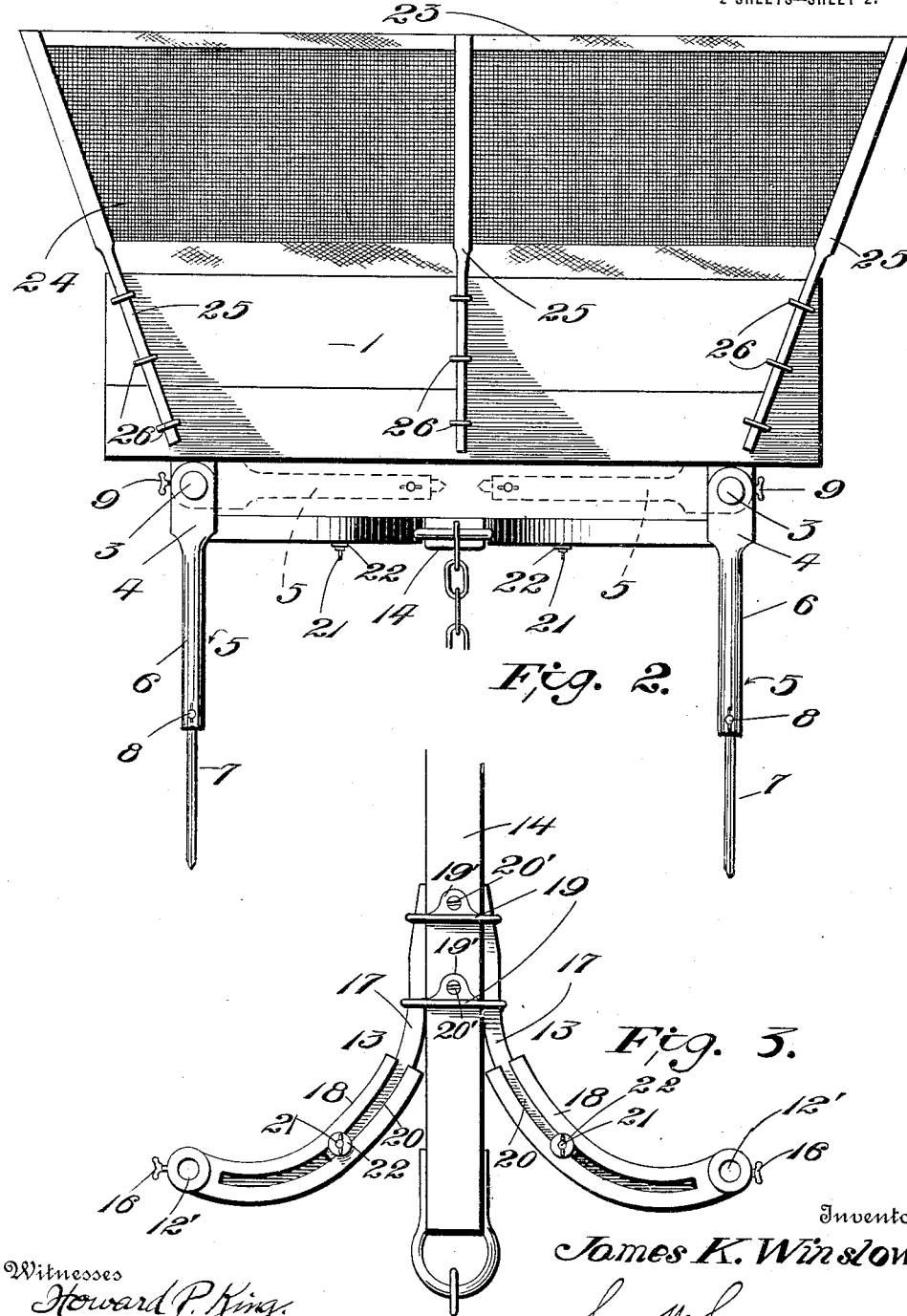

UNITED STATES PATENT OFFICE.

JAMES KELLEN WINSLOW, OF EAST ST. LOUIS, ILLINOIS.

FEED-BOX.

1,196,061. Specification of Letters Patent. Patented Aug. 29, 1916.

Application filed December 26, 1911, Serial No. 667,614. Renewed January 12, 1916. Serial No. 71,305.

*To all whom it may concern:*

Be it known that I, JAMES KELLEN WINSLOW, a citizen of the United States, and a resident of East St. Louis, in the county of St. Clair and State of Illinois, have invented certain new and useful Improvements in Feed-Boxes, of which the following is a specification, reference being had to the accompanying drawings.

This invention relates to improvements in portable feed boxes.

One object of the invention is to provide a feed box of this character having an improved construction and arrangement of folding and adjustable supporting mechanism, and means for attaching the box to the tongue of a vehicle.

Another object is to provide a feed box having a hay rack adapted to be removably secured to the rack and having means adapted to be engaged with the neck of the animal feeding from the box, whereby the contents of the box are prevented from being wasted.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

Figure 1:
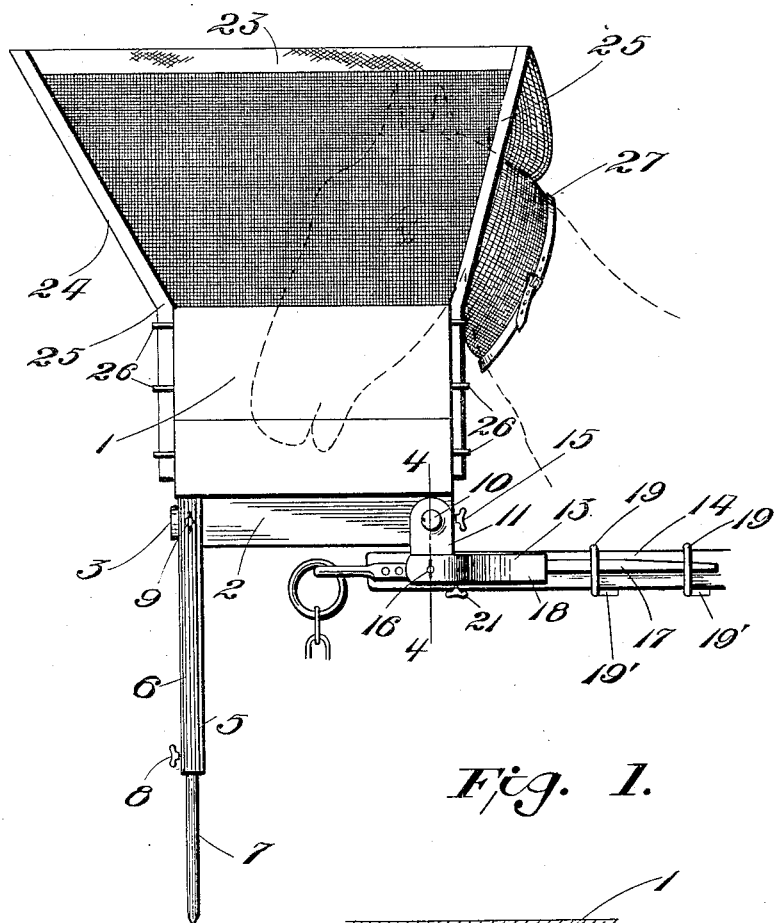
Figure 4:
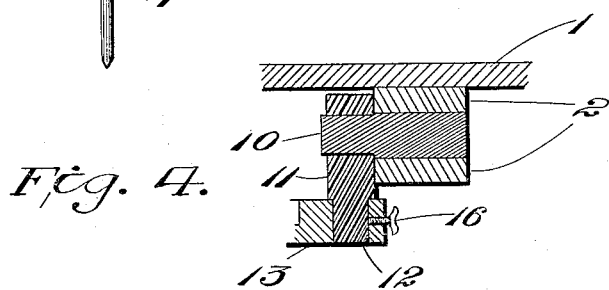

In the accompanying drawings forming a part of this specification and in which like numerals of reference indicate similar parts in the several views: Figure 1, is a side view of my improved feed box, showing the same applied to the tongue of a vehicle. Fig. 2, is a front view of the same. Fig. 3, is a bottom plan view of the outer end of a vehicle tongue showing the means for supporting and attaching the inner portion of the box to the tongue. Fig. 4, is a section on line 4, 4, of Fig. 1.

Referring more particularly to the drawings, 1 denotes the feed box, which may be of any suitable size and shape and constructed in either single or double form, the same being here shown as constructed in double form. The box may also be constructed of any suitable material and is here shown as being formed of wood, to the bottom of the box near each end is secured a cleat 2. The outer ends of the cleats 2 have formed thereon reduced cylindrical studs 3, with which are pivotally engaged the apertured heads 4, of front supporting legs 5. The legs are formed in adjustable sections 6 and 7, the lower section 7 being telescopically engaged with the upper section and secured in adjusted positions therein by set screws 8. The outer end of the lower leg sections 7 are pointed, to form a firm engagement with the ground. By pivotally attaching the legs 5 to the studs 3, the legs may be swung upwardly or folded when not in use, as shown in dotted lines in Fig. 2 of the drawings. The legs are firmly held on the studs 3, in their operative and folded positions by set screws 9, arranged in the heads 4 as shown. On the inner ends of the cleats 2 are arranged laterally projecting pivot studs 10, which are engaged with short supporting posts 11, having on their lower ends reduced cylindrical shanks 12, which are engaged with the sockets in the apertured outer ends of curved supporting arms 13, secured to the opposite sides of the tongue 14 of the vehicle. The studs 10 are secured in the posts 11 by set screws 15, and the shanks 12 are secured in the sockets 12' of the arms 13 by set screws 16, as shown. The arms 13 are formed in inner and outer telescopically engaged segmental sections 17 and 18. The inner sections 17 have their inner ends secured to the opposite sides of the tongue by clips 19, arranged on the latter, as shown. In the lower sides of the outer section 18 of the arms are formed curved slots 20, with which are engaged set screws 21, and clamping washers 22, whereby the outer sections of the arms are held in their adjusted positions on the inner sections.

Removably engaged with the upper side of the feed box is a hay rack 23, comprising a frame having outwardly flared sides and ends 24, covered with netting or other suitable fabric. The rack is supported and held in position on the box by standards 25, having reduced lower ends which are engaged with staples 26, arranged in the sides of the box, as shown. The covering of the inner side of the rack is constructed and arranged in the form of sleeves 27, which are placed over the head of and buckled or otherwise fastened around the necks of the animals when feeding from the box, as clearly shown in Fig. 1 of the drawings. By thus engaging the side of the rack with the heads and necks of the animals, they are prevented from wasting or throwing the grain from the box while feeding therefrom. By means of the supporting and attaching mechanism herein shown and described, the box may be secured to the tongue of a vehicle, and the animals permitted to feed therefrom without being unhitched. By folding the supporting legs, as shown in dotted lines in Fig. 2, and supporting the box entirely on the tongue, the animals may feed therefrom while walking or working.

A feed box constructed in accordance with my invention will be sanitary, and well ventilated, so that the animals feeding therefrom may breathe freely while eating. The box is economical in that it prevents the waste of feed, and any kind of feed may be used therein. When not in use the parts may be disassembled and packed closely in the box, so that the device will take up very little space and may be readily carried in the vehicle or strapped to the animals.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent is:

1. In a feed box of the character described, an attaching and supporting mechanism comprising supporting arms formed in telescopically engaged inner and outer sections, means to secure said sections together, sockets formed on the ends of the outer sections, clips to fasten the inner sections to the tongue of a vehicle, cleats secured to the bottom of the box and having on their outer ends forwardly extending cylindrical studs and near their inner ends laterally projecting studs, apertured supporting posts having eyes to receive said lateral studs, shanks on said posts to engage the sockets on said arms whereby the box is secured to the arms, set screws arranged in said posts and supporting legs pivotally attached to the studs on the outer ends of the cleats.

2. In a feed box of the character described, an attaching and supporting mechanism, comprising adjustable supporting arms secured to a vehicle pole, adjustable supporting legs pivotally connected to the box and adapted to be folded to an inoperative position, a hay rack comprising a frame having sides and ends formed of fabric, means whereby the frame is secured to the box and sleeves arranged in one side of the box and adapted to be fastened around the necks of the animals feeding from the box, thereby preventing the wasting of the feed.

3. The combination with a feed box, of studs extending from the outer face of said box, supporting legs held upon said studs, studs extending from the opposite side of said box, supporting posts upon said last mentioned studs, curved supporting arms upon said posts, an inner segmental section telescopically engaged within each of said curved arms, and means to hold said segmental sections to said curved arms.

In testimony whereof I affix my signature, in presence of two witnesses.

JAMES KELLEN WINSLOW.

Witnesses:
C. H. NESMITH,
SIM MERRIMAN.

Copies of this patent may be obtained for five cents each, by addressing the "Commissioner of Patents, Washington, D. C."